Figure 1:
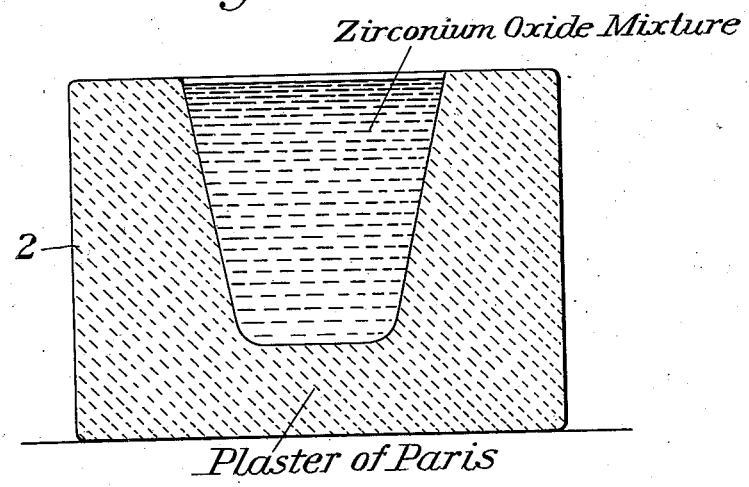

June 7, 1932.   M. METH   1,862,191

METHOD OF MAKING REFRACTORY ARTICLES

Filed March 16, 1928

INVENTOR
Max Meth,
by Byrnes, Stebbins & Parmelee,
his Attys.

Patented June 7, 1932

1,862,191

UNITED STATES PATENT OFFICE

MAX METH, OF PITTSBURGH, PENNSYLVANIA, ASSIGNOR TO FIRTH STERLING STEEL COMPANY, OF McKEESPORT, PENNSYLVANIA, A CORPORATION OF PENNSYLVANIA

METHOD OF MAKING REFRACTORY ARTICLES

Application filed March 16, 1928. Serial No. 262,169.

The present invention relates broadly to the art of refractory materials and articles, and more particularly to an improved method of making an article of zirconium adapted to withstand extremely high temperatures.

At the present time, it is customary, for example in the metallurgical industry in the melting of metals or substances having extremely high melting points, to utilize graphite crucibles. Such crucibles have the inherent disadvantage of giving up carbon to the substance being heated, the actual percentage of carbon varying under different conditions so that objectionable results are sometimes obtained. Furthermore, graphite crucibles have a comparatively short life, thereby representing a substantial expense in the production of material requiring their use.

Attempts have heretofore been made to utilize zirconium as a high temperature refractory, but without any success from a commercial standpoint. Heretofore in utilizing zirconium, difficulty has been experienced in the obtaining of a suitable binder, both clay and organic substances having been tried. The clay forms an eutectic mixture, thereby lowering the usefulness of the finished article, while organic binders result in the production of a skin on the surface of the article which holds the moisture in solution therein, whereby objectionable cracking results when it is subjected to high temperature conditions.

In accordance with the present invention, I am able to produce a refractory article composed entirely or substantially entirely of zirconium oxide capable of withstanding temperature conditions in the neighborhood of 2400° C., without cracking and without chemically affecting the substance being treated therein. It will thus be seen that an article produced in accordance with my invention may not only be used advantageously as a crucible, but may be used to advantage as a lining for furnaces and the like where a refractory having a neutral action is desired.

In the accompanying drawing, I have illustrated somewhat diagrammatically one manner of carrying out the present invention, it being understood that the drawing is intended by way of illustration only and not by way of limitation.

Figure 2:
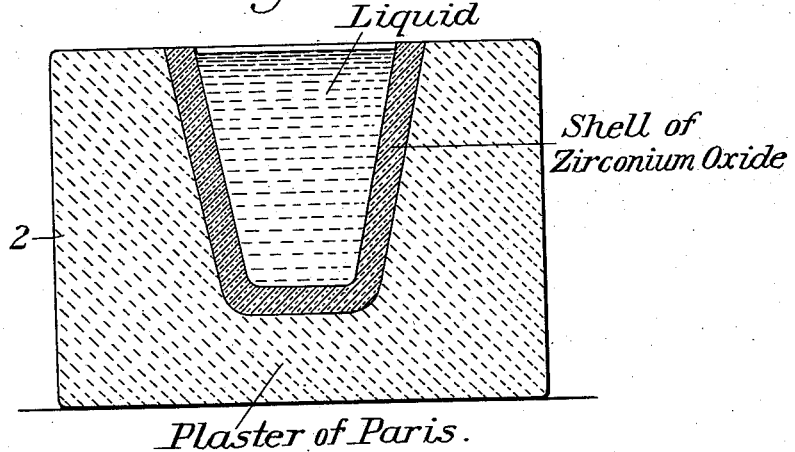

In the drawing:

Figure 1 is a vertical sectional view through a mold used in accordance with my invention; and Figure 2 is a similar view through a mold with a partially formed article therein.

In accordance with the present invention, I take the desired quantity of zirconium oxide in finely powdered form and mix it in water in the presence of hydrochloric acid either pure or diluted. After thoroughly mixing the mass, I place it in a liquid condition within a mold 2 of plaster of Paris or similar material effective for withdrawing moisture therefrom. The mass is permitted to remain in the mold for a length of time dependent upon the characteristics of the article which it is desired to produce. In the case of crucibles, I retain the mixture in the mold until the moisture content has been withdrawn from the outer portion of the mass to an extent sufficient to give the desired wall thickness, this condition being illustrated in Figure 2 of the drawing. Thereafter, the fluid contents from the interior of the partially dry shell are poured out, thereby leaving a wall having the required thickness and having a contour determined by the mold cavity.

This shell has a consistency at this time such as to be self-supporting and such as to permit working in case it is desired to change the shape or appearance thereof. After such working or immediately upon its removal from the mold, it is placed in an electric furnace presenting a heating chamber preferably entirely free from carbon, and heated to a temperature of from 2000° C. to 2400° C., to sinter the same to a vitreous or semi-vitreous state.

I have found that an article thus produced may be dropped from a temperature of 2400° C. to substantially room temperature by artificial cooling means in a period of fifteen minutes, without any objectionable cracking. Preferably, however, I subject the vitreous or semi-vitreous article to a soaking heat for considerable period of time before permitting the same to cool. This operation is preferably carried out at a temperature of approximately 2000 to 2400° C. for a period of from two to four hours, the length of time and the temperature being variable over a considerable range without substantially affecting the quality of the article.

The temperature conditions to which the mass is subjected result in driving off all the moisture content, thereby leaving a finished article which is substantially 100% zirconium oxide, any variation from this percentage being represented by the amount of foreign materials in the oxide originally utilized. A crucible thus produced is therefore inert with respect to substances treated therein and is free from any objectionable giving up of carbon as is the case with graphite molds utilized at the present time. It also possesses greater inherent strength and may be used, with care, for in excess of one hundred heats, without any objectionable deterioration or spalling.

I believe that the hydrochloric acid, regardless of the condition thereof or the amount utilized, possesses the faculty of causing the zirconium oxide to bond itself together as herein recited, so that the use of any binding material is obviated.

The invention also adapts itself to the formation of any desired self-sustaining and self-bonded articles, such as blocks, bricks, molds and the like, in connection with which high temperature conditions may be required.

I claim:

1. In the method of making refractory articles, the steps comprising mixing zirconium oxide in the presence of hydrochloric acid, shaping the mass, and subjecting the same to a sintering temperature.

2. In the method of making refractory articles, the steps comprising mixing zirconium oxide in the presence of hydrochloric acid, shaping the mass, and subjecting the same to a sintering temperature in excess of 2000° C.

3. In the method of forming refractory articles, the steps comprising forming a mixture of powdered zirconium oxide and hydrochloric acid, shaping the same, and sintering the shaped article to produce a semi-vitreous article.

In testimony whereof I have hereunto set my hand.

MAX METH.